US011862861B2

United States Patent
Liu et al.

(10) Patent No.: US 11,862,861 B2
(45) Date of Patent: Jan. 2, 2024

(54) HYBRID WIRELESS TRANSCEIVER ARCHITECTURE THAT SUPPORTS MULTIPLE ANTENNA ARRAYS

(71) Applicant: Qualcomm Incorporated, San Diego, CA (US)

(72) Inventors: Li Liu, San Diego, CA (US); Kevin Hsi Huai Wang, San Diego, CA (US); Yunfei Feng, San Diego, CA (US); Chuan Wang, San Diego, CA (US); Gurkanwal Sahota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/653,449

(22) Filed: Mar. 3, 2022

(65) Prior Publication Data
US 2022/0224022 A1    Jul. 14, 2022

Related U.S. Application Data

(63) Continuation of application No. 16/140,127, filed on Sep. 24, 2018, now Pat. No. 11,271,328.

(51) Int. Cl.
*H01Q 21/30* (2006.01)
*H01Q 5/35* (2015.01)
*H04B 1/18* (2006.01)
*H04B 1/44* (2006.01)
*H01Q 21/06* (2006.01)

(52) U.S. Cl.
CPC ............... *H01Q 21/30* (2013.01); *H01Q 5/35* (2015.01); *H04B 1/18* (2013.01); *H04B 1/44* (2013.01); *H01Q 21/065* (2013.01)

(58) Field of Classification Search
CPC .......... H04B 1/44; H04B 1/18; H01Q 21/065; H01Q 5/35; H01Q 21/30
See application file for complete search history.

(56) References Cited

U.S. PATENT DOCUMENTS

| 7,808,443 | B2 | 10/2010 | Lindmark et al. |
| 9,191,057 | B2 | 11/2015 | Ainspan et al. |
| 9,374,121 | B2* | 6/2016 | Weissman ............... H04B 1/40 |
| 9,490,886 | B2 | 11/2016 | Lin |

(Continued)

FOREIGN PATENT DOCUMENTS

WO    2014036519 A1    3/2014

OTHER PUBLICATIONS

International Search Report and Written Opinion—PCT/US2019/052377—ISA/EPO—dated Nov. 28, 2019.

(Continued)

*Primary Examiner* — Graham P Smith
(74) *Attorney, Agent, or Firm* — Colby Nipper/Qualcomm Incorporated

(57) ABSTRACT

An apparatus is disclosed for a hybrid wireless transceiver architecture that supports multiple antenna arrays. In an example aspect, the apparatus includes a first antenna array, a second antenna array, and a wireless transceiver. The wireless transceiver includes first dedicated circuitry dedicated to the first antenna array and second dedicated circuitry dedicated to the second antenna array. The wireless transceiver also includes shared circuitry that is shared with both the first antenna array and the second antenna array.

26 Claims, 10 Drawing Sheets

(56) References Cited

U.S. PATENT DOCUMENTS

| | | |
|---|---|---|
| 9,661,506 B2 | 5/2017 | Chen et al. |
| 11,271,328 B2 | 3/2022 | Liu et al. |
| 2010/0035561 A1 | 2/2010 | Rettig et al. |
| 2012/0309331 A1 | 12/2012 | Yehezkely et al. |
| 2013/0094522 A1 | 4/2013 | Moshfeghi |
| 2015/0087248 A1 | 3/2015 | Yehezkely |
| 2015/0372396 A1 | 12/2015 | Sienkiewicz et al. |
| 2018/0167130 A1 | 6/2018 | Vannucci |

OTHER PUBLICATIONS

International Preliminary Report on Patentability—PCT/US2019/052377, The International Bureau of WIPO—Geneva, Switzerland, dated Apr. 1, 2021.

* cited by examiner ed States patent: US 11,862,861 B2

HYBRID WIRELESS TRANSCEIVER ARCHITECTURE THAT SUPPORTS MULTIPLE ANTENNA ARRAYS

RELATED APPLICATION

This application is a continuation of and claims priority to U.S. Non-Provisional patent application Ser. No. 16/140,127, filed on Sep. 24, 2018, the disclosure of which is incorporated by reference herein in its entirety.

TECHNICAL FIELD

This disclosure relates generally to wireless transceivers and, more specifically, to a wireless transceiver that includes respective dedicated circuitry and shared circuitry for multiple antenna elements of different antenna arrays.

BACKGROUND

Electronic devices use radio-frequency (RF) signals to communicate information. These radio-frequency signals enable users to talk with friends, download information, share pictures, remotely control household devices, receive global positioning information, employ radar for object detection and tracking, listen to radio stations, and so forth. To increase spatial coverage or to support multiple frequency bands, it may be desirable for the electronic device to include multiple antenna arrays.

A quantity of antenna arrays that can be implemented, however, may be significantly limited by an architecture of a wireless transceiver that is implemented within the electronic device. For some wireless transceiver architectures, it can be challenging to support multiple antenna arrays and fit within a size constraint of a given electronic device without adversely impacting system performance or increasing cost, especially for portable electronic devices like smartphones or wearable devices. Consequently, some wireless transceiver architectures may limit an electronic device's spatial diversity or frequency diversity capabilities by limiting the quantity of antenna arrays it can support.

SUMMARY

An apparatus is disclosed that utilizes a hybrid wireless transceiver architecture to support multiple antenna arrays. While some transceiver architectures may use dedicated circuitry and other transceiver architectures may use shared circuitry, the hybrid wireless transceiver architecture is a hybrid of these types of architectures and includes some shared circuitry and some dedicated circuitry. The described techniques implement a wireless transceiver with dedicated circuitry coupled to the multiple antenna arrays and shared circuitry coupled to the dedicated circuitry. The dedicated circuitry includes dedicated components that condition signals for different antenna arrays. In contrast, shared components within the shared circuitry condition signals for multiple antenna arrays. While the dedicated components enable the wireless transceiver to achieve a target linearity and noise figure performance, use of the shared circuitry can appreciably reduce a total size of the wireless transceiver. In this way, the hybrid architecture enables the wireless transceiver to be implemented within space-constrained devices and still support a larger quantity of antenna arrays relative to other wireless transceiver architectures. With a larger quantity of antenna arrays, an electronic device may increase spatial coverage for one or more frequency bands (e.g., millimeter-wave (mmW) frequency bands) to increase frequency diversity.

In an example aspect, an apparatus is disclosed. The apparatus includes a first antenna array, a second antenna array, and a wireless transceiver. The wireless transceiver includes first dedicated circuitry dedicated to the first antenna array and second dedicated circuitry dedicated to the second antenna array. The wireless transceiver also includes shared circuitry that is shared with both the first antenna array and the second antenna array.

In an example aspect, an apparatus is disclosed. The apparatus includes a first antenna array configured to respond to a first signal, a second antenna array configured to respond to a second signal, and a wireless transceiver. The wireless transceiver includes dedicated means for independently conditioning the first signal and the second signal. The wireless transceiver also includes shared means for conditioning both the first signal and the second signal.

In an example aspect, a method for supporting multiple antenna arrays via a hybrid wireless transceiver architecture is disclosed. The method includes passing a first signal via an antenna element of a first antenna array and conditioning the first signal using a first dedicated component of a wireless transceiver. The method also includes passing a second signal via another antenna element of a second antenna array and conditioning the second signal using a second dedicated component of the wireless transceiver. Using at least one shared component of the wireless transceiver, the method includes conditioning the first signal and the second signal.

In an example aspect, an apparatus is disclosed. The apparatus includes an antenna element associated with a first antenna array, another antenna element associated with a second antenna array, and a wireless transceiver. The wireless transceiver includes a first amplifier, a second amplifier, and at least one mixer. The first amplifier is coupled to the antenna element of the first antenna array. The second amplifier is coupled to the other antenna element of the second antenna array. The at least one mixer is coupled to both the first amplifier and the second amplifier.

BRIEF DESCRIPTION OF DRAWINGS

FIG. 3-1 illustrates example implementations of multiple antenna arrays that are supported by a hybrid wireless transceiver architecture.

FIG. 3-2 illustrates an example arrangement of multiple antenna arrays within an electronic device that utilizes a hybrid wireless transceiver architecture.

FIG. 4-1 illustrates an example wireless transceiver that utilizes a hybrid wireless transceiver architecture to support multiple antenna arrays.

FIG. 4-2 illustrates example components within dedicated circuitry, a shared circuitry, and an interface circuit for supporting multiple antenna arrays with a hybrid wireless transceiver architecture.

FIG. 5-1 illustrates an example implementation of a radio-frequency circuit that utilizes a hybrid wireless transceiver architecture for supporting multiple antenna arrays.

FIG. 5-2 illustrates another example implementation of a radio-frequency circuit that utilizes a hybrid wireless transceiver architecture for supporting multiple antenna arrays.

FIG. 5-3 illustrates an additional example implementation of a radio-frequency circuit that utilizes a hybrid wireless transceiver architecture for supporting multiple antenna arrays.

DETAILED DESCRIPTION

Although utilizing multiple antenna arrays may increase spatial coverage of an electronic device or increase a quantity of frequency bands supported by the electronic device, it may be challenging to design a wireless transceiver to support the multiple antenna arrays and fit within a size constraint of the electronic device without adversely impacting system performance or increasing cost. Some wireless transceiver architectures include separate or dedicated transceiver chains for each antenna element within the multiple antenna arrays. These separate transceiver chains, however, occupy space and may limit a quantity of antenna arrays that can be supported within smaller electronic devices. Consequently, this approach may be impractical for electronic devices that place a premium on small size or low weight.

Other wireless transceiver architectures may utilize switches to connect a shared transceiver chain to different antenna elements of different antenna arrays. The switches, however, add an additional cost to the wireless transceiver and add insertion loss, which degrades system performance. In this case, amplifier stages within the wireless transceiver are shared with different antenna elements of different antenna arrays. However, because the switches are coupled between the antenna arrays and the amplifier stages, the wireless transceiver architecture can experience degraded gain, output power, linearity, or noise figure performance.

To address such challenges, techniques for a hybrid wireless transceiver architecture that supports multiple antenna arrays are described herein. The described techniques implement a wireless transceiver with dedicated circuitry coupled to the multiple antenna arrays and shared circuitry coupled to the dedicated circuitry. The dedicated circuitry includes dedicated components that condition signals for different antenna arrays. In contrast, shared components within the shared circuitry condition the signals for multiple antenna arrays. While the dedicated components enable the wireless transceiver to achieve a target linearity and noise figure performance, use of the shared circuitry can appreciably reduce a total size of the wireless transceiver. In this way, the hybrid architecture enables the wireless transceiver to be implemented within space-constrained devices and still support a larger quantity of antenna arrays relative to other wireless transceiver architectures. With a larger quantity of antenna arrays, an electronic device may increase spatial coverage for one or more frequency bands (e.g., a millimeter-wave (mmW) frequency band).

Figure 1:
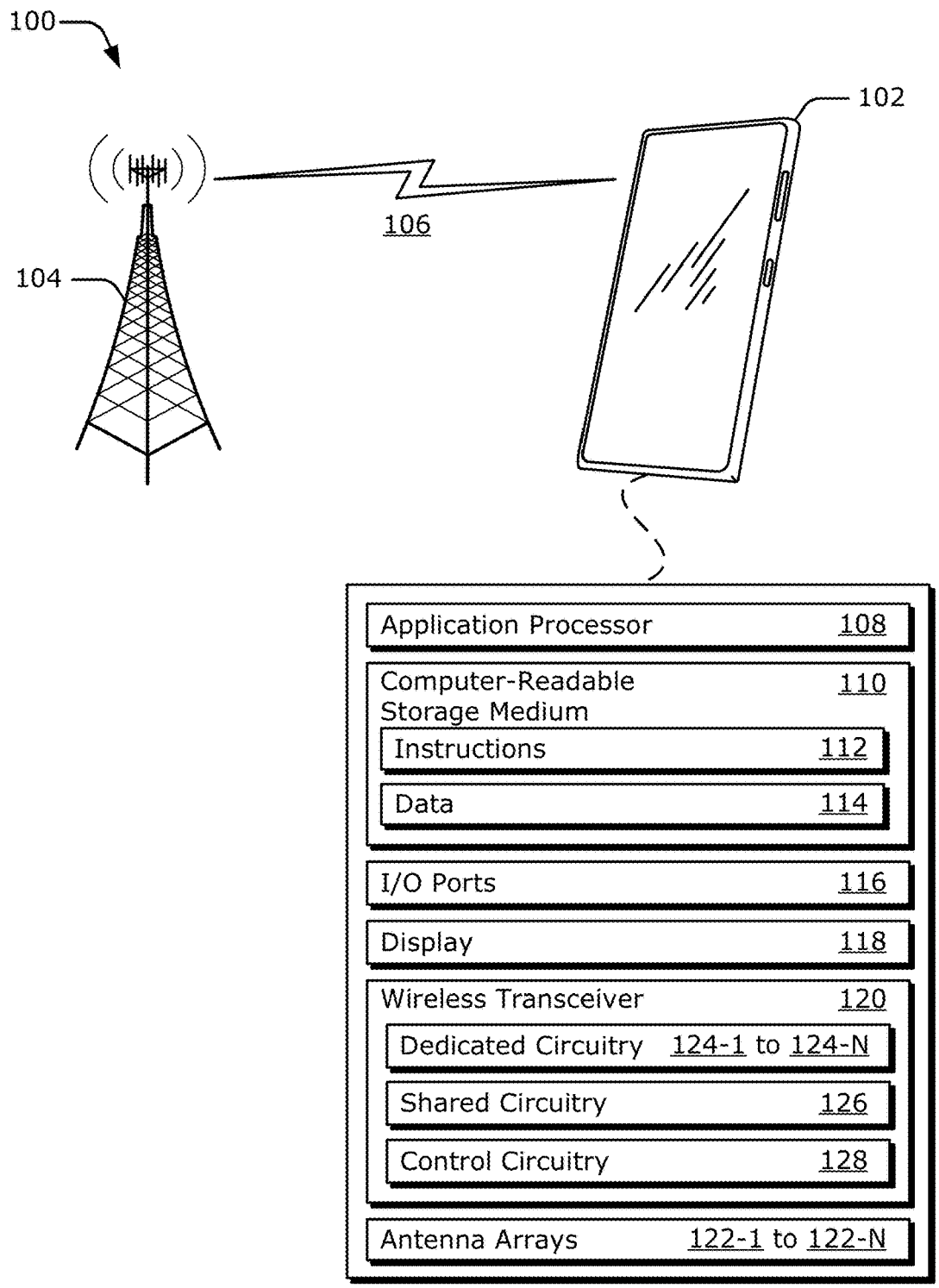
FIG. 1 illustrates an example environment for utilizing a hybrid wireless transceiver architecture to support multiple antenna arrays.

FIG. 1 illustrates an example environment 100 for utilizing a hybrid wireless transceiver architecture to support multiple antenna arrays. In the example environment 100, a computing device 102 communicates with a base station 104 through a wireless communication link 106 (wireless link 106). In this example, the computing device 102 is depicted as a smart phone. However, the computing device 102 may be implemented as any suitable computing or electronic device, such as a modem, cellular base station, broadband router, access point, cellular phone, gaming device, navigation device, media device, laptop computer, desktop computer, tablet computer, wearable computer, server, network-attached storage (NAS) device, smart appliance or other internet of things (IoT) device, medical device, vehicle-based communication system, radar, radio apparatus, and so forth.

The base station 104 communicates with the computing device 102 via the wireless link 106, which may be implemented as any suitable type of wireless link. Although depicted as a tower of a cellular network, the base station 104 may represent or be implemented as another device, such as a satellite, server device, terrestrial television broadcast tower, access point, peer-to-peer device, mesh network node, fiber optic line, and so forth. Therefore, the computing device 102 may communicate with the base station 104 or another device via a wired connection, a wireless connection, or a combination thereof.

The wireless link 106 can include a downlink of data or control information communicated from the base station 104 to the computing device 102, or an uplink of other data or control information communicated from the computing device 102 to the base station 104. The wireless link 106 may be implemented using any suitable communication protocol or standard, such as second-generation (2G), third-generation (3G), fourth-generation (4G), fifth-generation (5G), IEEE 802.11 (e.g., Wi-Fi™), IEEE 802.15 (e.g., Bluetooth™), IEEE 802.16 (e.g., WiMAX™), and so forth. In some implementations, the wireless link 106 may wirelessly provide power and the base station 104 may comprise a power source.

As shown, the computing device 102 includes an application processor 108 and a computer-readable storage medium 110 (CRM 110). The application processor 108 may include any type of processor, such as a multi-core processor, that executes processor-executable code stored by the CRM 110. The CRM 110 may include any suitable type of data storage media, such as volatile memory (e.g., random access memory (RAM)), non-volatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 may also include input/output ports 116 (I/O ports 116) and a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, user interface ports such as a touchscreen, and so forth. The display 118 presents graphics of the computing device 102, such as a user interface associated with an operating system, program, or application. Alternately or additionally, the display 118 may be implemented as a display port or virtual interface, through which graphical content of the computing device 102 is presented.

A wireless transceiver 120 of the computing device 102 provides connectivity to respective networks and other electronic devices connected therewith. Alternately or additionally, the computing device 102 may include a wired transceiver, such as an Ethernet or fiber optic interface for communicating over a local network, intranet, or the Internet. The wireless transceiver 120 may facilitate communication over any suitable type of wireless network, such as a wireless local area network (LAN) (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving communication signals via at least two antenna arrays 122-1 to 122-N. Components of the wireless transceiver 120 can include amplifiers, switches, mixers, analog-to-digital converters, filters, and so forth for conditioning the communication signals (e.g., for generating or processing signals). The wireless transceiver 120 may also include logic to perform in-phase/quadrature (I/Q) operations, such as synthesis, encoding, modulation, decoding, demodulation, and so forth. In some cases, components of the wireless transceiver 120 are implemented as separate receiver and transmitter entities. Additionally or alternatively, the wireless transceiver 120 can be realized using multiple or different sections to implement respective receiving and transmitting operations (e.g., separate transmit and receiver chains). In general, the wireless transceiver 120 processes data and/or signals associated with communicating data of the computing device 102 over the antenna arrays 122-1 and 122-N.

Although not explicitly depicted, the wireless transceiver 120 may also include a processor to perform high-rate sampling processes that can include analog-to-digital conversion, digital-to-analog conversion, gain correction, skew correction, frequency translation, and so forth. The processor can provide communication data to the wireless transceiver 120 for transmission and can process a baseband version of a signal received via the wireless transceiver 120 to generate data. The data can be provided to other parts of the computing device 102 via a communication interface for wireless communication.

In example implementations, the wireless transceiver 120 includes dedicated circuitry 124-1 to 124-N and shared circuitry 126. The dedicated circuitry 124-1 to 124-N are respectively coupled to the antenna arrays 122-1 to 122-N. For example, the dedicated circuitry 124-1 includes at least a first component dedicated to a first antenna array 122-1 and the dedicated circuitry 124-N includes at least an Nth component dedicated to the antenna array 122-N (shown in FIGS. 3-1 and 3-2). The first component and the second component can each comprise an active component or a passive component. In general, the dedicated circuitry 124-1 to 124-N includes dedicated components that are respectively coupled to individual antenna elements of the antenna arrays 122-1 and 122-N. These dedicated components individually condition signals for respective ones of different antenna arrays 122-1 to 122-N. A signal that is conditioned by a dedicated component propagates to or from the antenna array that the dedicated component is associated with and does not substantially propagate to or from another antenna array for which the dedicated component is not associated with.

In contrast, the shared circuitry 126 includes at least one component that is common to, or shared with, at least two antenna arrays or more (e.g., shared with both the antenna arrays 122-1 and 122-2). Generally, the shared component is coupled to multiple antenna elements associated with different antenna arrays 122-1 to 122-N via the dedicated components of the dedicated circuitry 124-1 to 124-N. The shared component conditions signals that propagate to or from one or more of the multiple antenna arrays 122-1 to 122-N at a same time period or at different time periods. The dedicated circuitry 124-1 to 124-N and the shared circuitry 126 can at least partially implement the hybrid wireless transceiver architecture that supports multiple antenna arrays 122-1 to 122-N, as further described with respect to FIGS. 2, 4-1, 4-2, and 5-1 to 5-3.

The wireless transceiver 120 also includes control circuitry 128, which may be implemented within or separate from the wireless transceiver 120 as a modem, a general-purpose processor, a controller, fixed logic circuitry, hard-coded logic, some combination thereof, and so forth. Components of the control circuitry 128 can be localized at one module or one integrated circuit chip or can be distributed across multiple modules or chips. Although not explicitly shown, the control circuitry 128 can include at least one CRM (e.g., the CRM 110), can include a portion of the CRM 110, or can access the CRM 110 to obtain computer-readable instructions (e.g., instructions 112). The control circuitry 128 controls the wireless transceiver 120 and enables wireless communication to be performed.

In general, the control circuitry 128 can control an operational mode of the wireless transceiver 120 or has knowledge of a current operational mode. Different types of operational modes may include a transmission mode, a reception mode, different spatial coverage modes, different frequency modes (e.g., a high frequency mode or a low frequency mode), different power modes (e.g., a low-power mode or a high-power mode), different resource control states (e.g., a connected mode, an inactive mode, or an idle mode), different modulation modes (e.g., a lower-order modulation mode such as quadrature phase-shift keying (QPSK) modes or higher-order modulation modes such as 64 quadrature amplitude modulation (QAM) or 256 QAM), and so forth. Some or all of these modes may be associated with different antenna arrays 122-1 to 122-N. Therefore, to support a particular operational mode, the control circuitry 128 enables the corresponding antenna arrays 122-1 to 122-N to be utilized.

The antenna arrays 122-1 and 122-N can be selected for use during a same time period or during different time periods. The control circuitry 128 ensures that signals can propagate between the dedicated components of the dedicated circuitry 124-1 to 124-N and the shared circuitry 126 without introducing significant losses. The control circuitry 128 can also ensure that the propagation between the dedicated circuitry 124-1 to 124-N and the shared circuitry 126 achieve intended functions like power splitting or power combining. In some cases, the control circuitry 128 indirectly controls the propagation of the signals by causing the dedicated components associated with the selected antenna array 122-1 or 122-N to be in an active state (e.g., to be powered on) and causing the other dedicated components to be in an inactive state (e.g., to be powered off). In other cases, the control circuitry 128 directly controls the propagation of the signals between the dedicated circuitry 124-1 to 124-N and the shared circuitry 126 via an interface circuit, which is further described with respect to FIGS. 4-2 and 5-3. The wireless transceiver 120 and the antenna arrays 122-1 and 122-N are further described with respect to FIG. 2.

Figure 2:
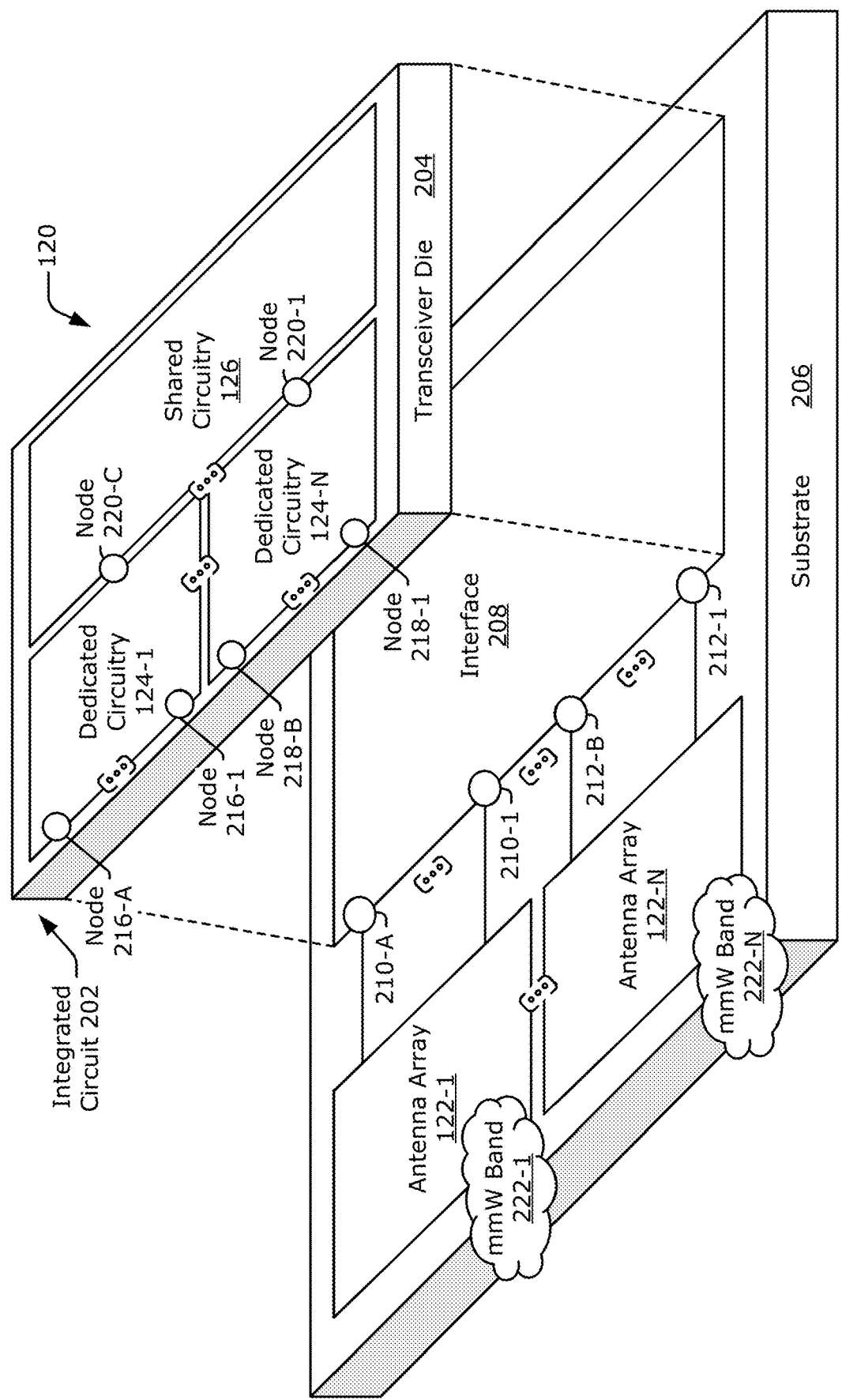
FIG. 2 illustrates an example integration of a portion of a wireless transceiver and multiple antenna arrays for supporting the multiple antenna arrays with a hybrid wireless transceiver architecture.

FIG. 2 illustrates an example integration of a portion of the wireless transceiver 120 and the antenna arrays 122-1 and 122-N for supporting multiple antenna arrays with a hybrid wireless transceiver architecture. In the depicted configuration, the wireless transceiver 120 includes at least one integrated circuit 202, which is implemented on a transceiver die 204. In this case, the integrated circuit 202 includes the dedicated circuitry 124-1 to 124-N and the shared circuitry 126. If the wireless transceiver 120 includes other integrated circuits, other portions of the shared circuitry 126 may be implemented within these other integrated circuits.

The integrated circuit 202 can be mounted to a substrate 206, which includes an interface 208 with multiple terminals and the antenna arrays 122-1 to 122-N. The interface 208, which is disposed on a surface of the substrate 206, is configured to accept and connect to the transceiver die 204. The multiple terminals of the interface 208 are represented as terminals 210-1 to 210-A and terminals 212-1 to 212-B, where "A" and "B" are integers that may or may not be equal to each other. The values of "A" and "B" are based on a total quantity of antenna elements of the antenna arrays 122-1 and 122-N. Each of the dedicated circuitry 124-1 to 124-N includes one or more dedicated components that are respectively associated with the antenna arrays 122-1 to 122-N.

Figures 1, 3:
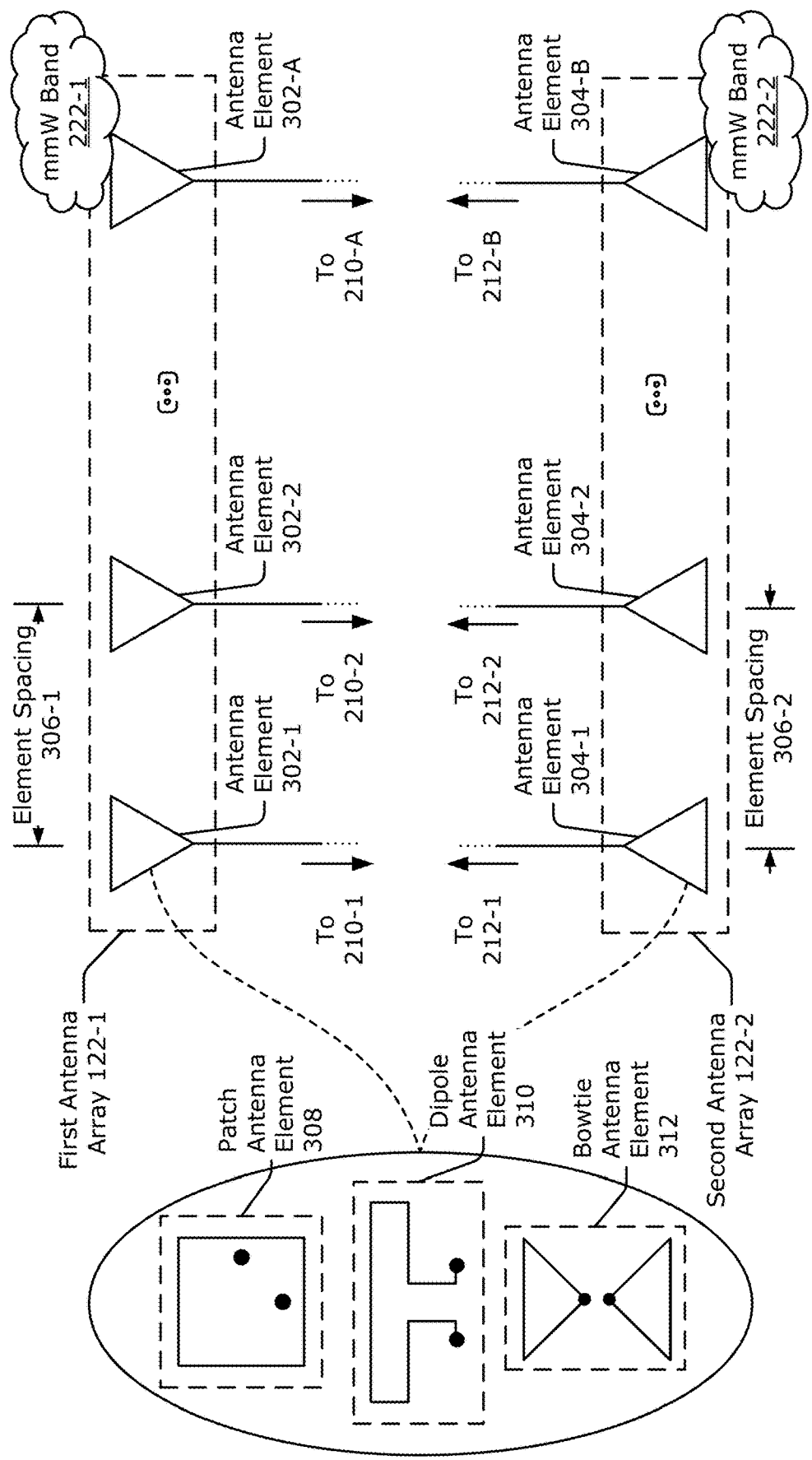
Figures 2, 3:
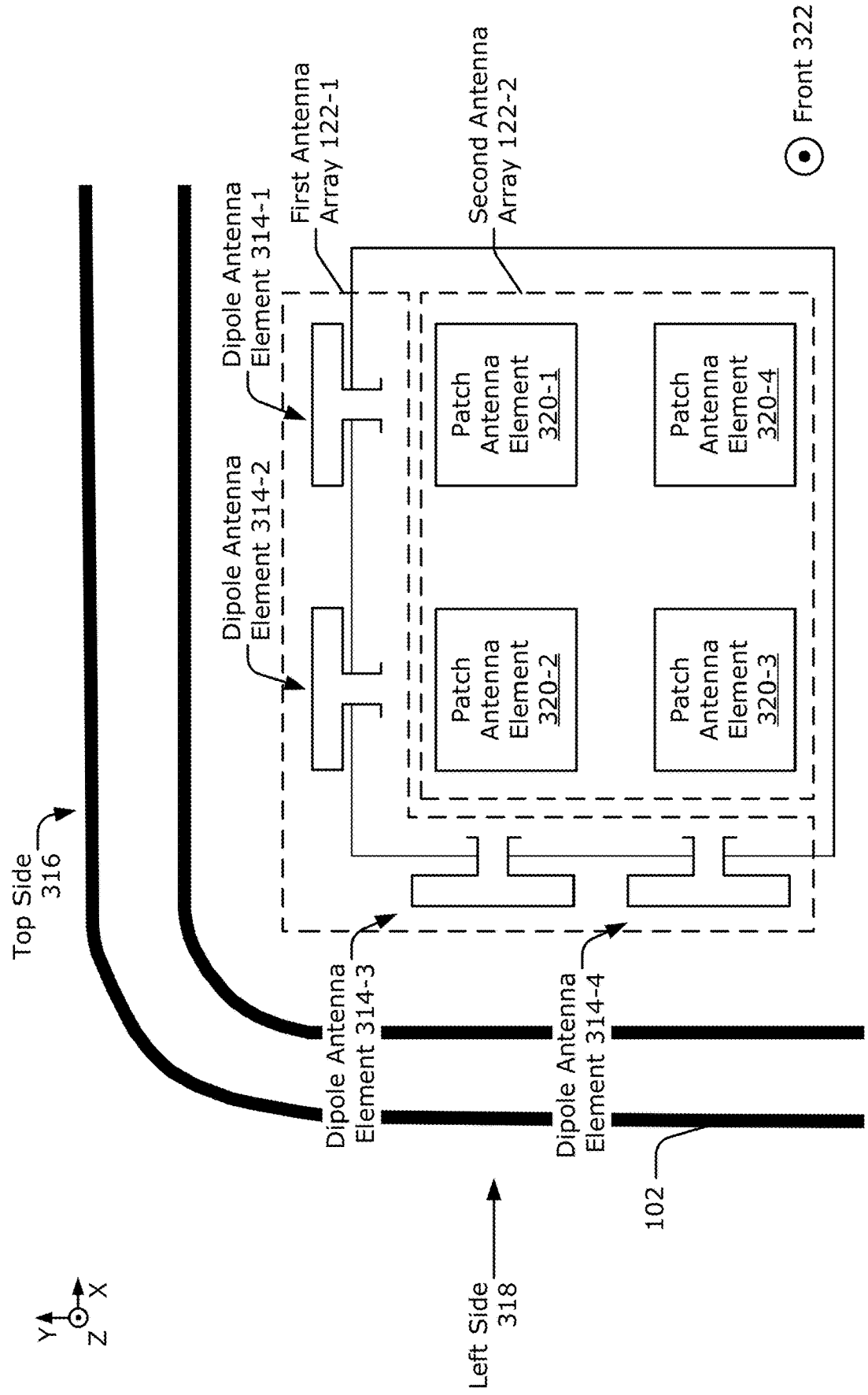
Figures 1, 5:
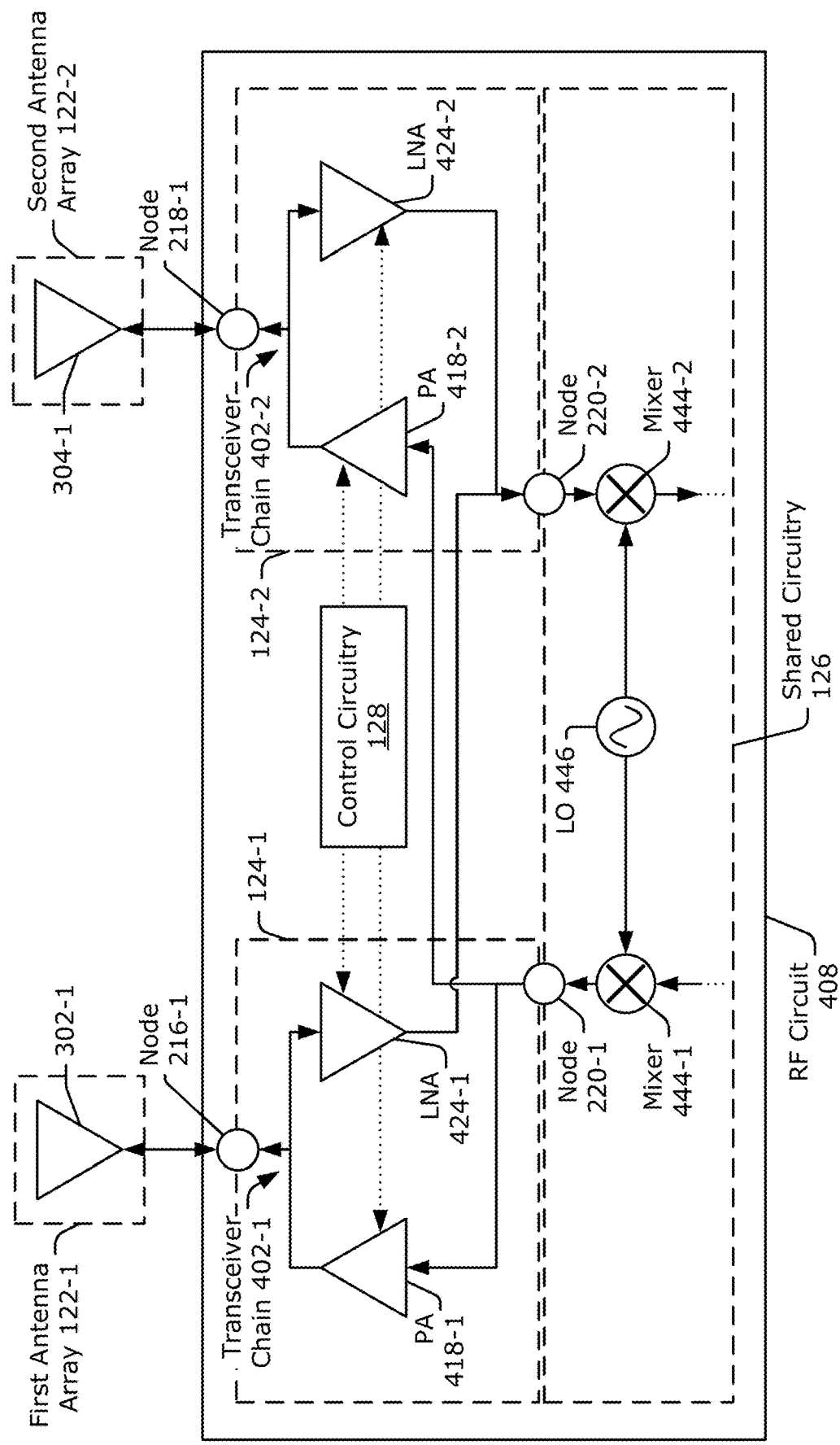
Figures 2, 5:
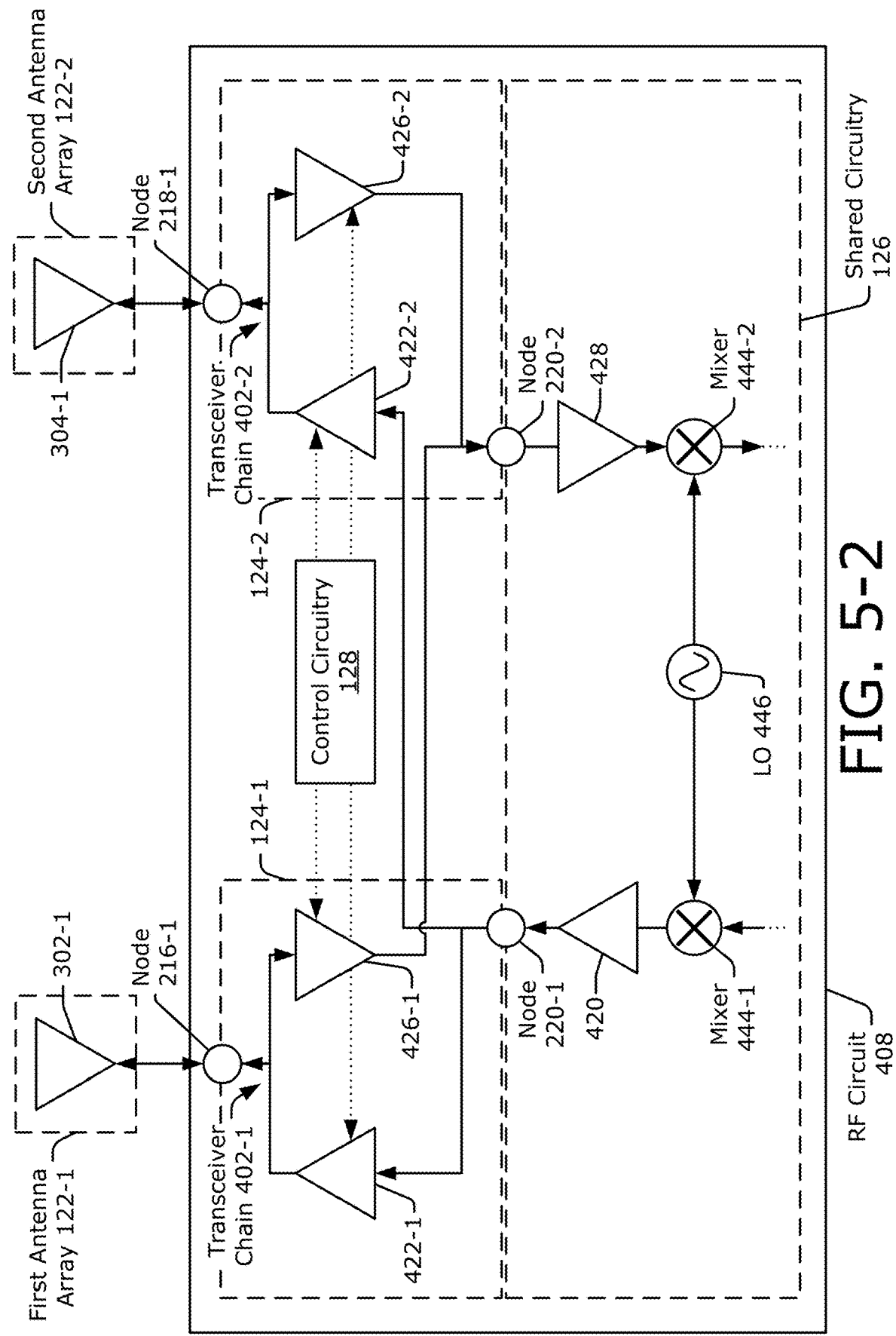
Figures 3, 5:
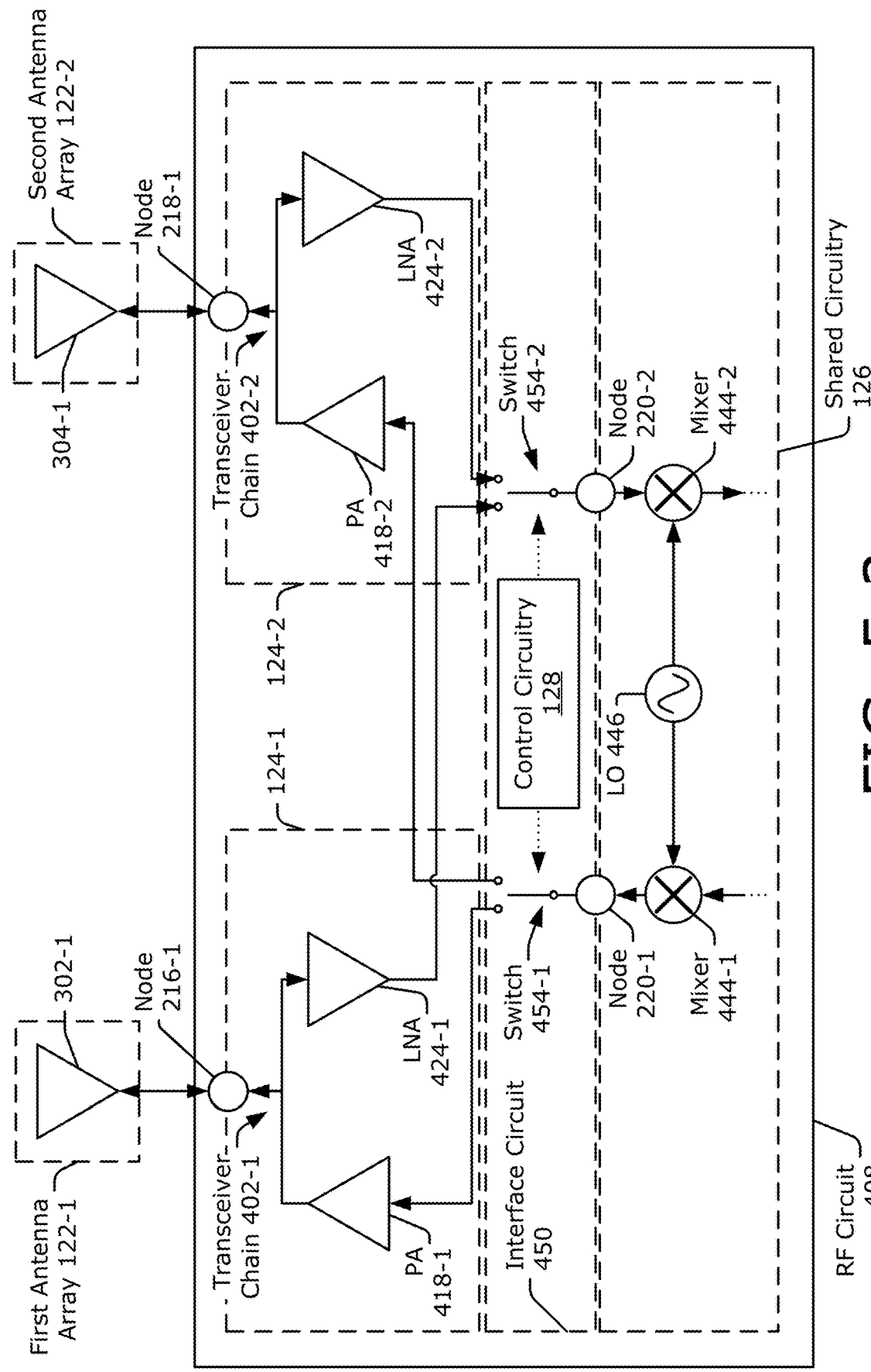

The terminals 210-1 to 210-A of the interface 208 connect the antenna elements of the antenna array 122-1 to nodes 216-1 to 216-A of the dedicated circuitry 124-1. Likewise, the terminals 212-1 to 212-B of the interface 208 connect the antenna elements of the antenna array 122-N to nodes 218-1 to 218-B of the dedicated circuitry 124-N. The nodes 216-1 to 216-A and 218-1 to 218-B are connected to respective front ends of multiple transceiver chains within the wireless transceiver 120, as shown in FIGS. 5-1 to 5-3. Within the dedicated circuitry 124-1 to 124-N, these multiple transceiver chains have separate communication paths that connect the nodes 216-1 to 216-A and 218-1 to 218-B to nodes 220-1 to 220-C, where "C" is a positive integer. In order to use the shared circuitry 126 for multiple antenna arrays 122-1 to 122-N, at least one of the nodes 216-1 to 216-A and at least one of the nodes 218-1 and 218-B are coupled to one of the nodes 220-1 to 220-C, although one or more dedicated components of the dedicated circuitry 124-1 to 124-N may be coupled between a respective node 216 and node 218 and the corresponding node 220. In some implementations, one or more interface components may be used to couple the dedicated components of the respective dedicated circuitry 124-1 to 124-N to the corresponding node 220.

Generally, the dedicated circuitry 124-1 is operationally coupled to the first antenna array 122-1 and operationally decoupled from the other antenna arrays (e.g., the Nth antenna array 122-N). Similarly, the dedicated circuitry 124-N is operationally coupled to the Nth antenna array 122-N and operationally decoupled from the other antenna arrays (e.g., the first antenna array 122-1).

Within the integrated circuit 202, the shared circuitry 126 is coupled to the dedicated circuitry 124-1 to 124-N via the nodes 220-1 to 220-C. In this way, the shared circuitry 126 is coupled to both the antenna arrays 122-1 and 122-N through the dedicated circuitry 124-1 to 124-N. At the nodes 220-1 to 220-C, the multiple transceiver chains within the wireless transceiver 120 have shared communication paths through the shared circuitry 126. At the nodes 220-1 to 220-C, a communication path within the shared circuitry 126 transitions to separate communication paths in the dedicated circuitry 124-1 to 124-N that are coupled to the associated antenna arrays 122-1 and 122-N. Although not explicitly depicted, the interface 208 can include additional terminals to connect the dedicated circuitry 124-1 to 124-N or the shared circuitry 126 to other components, such as another integrated circuit that is a part of the wireless transceiver 120 or the control circuitry 128 (not shown). In some aspects, the antenna elements within the antenna arrays 122-1 to 122-N can be directly connected to the terminals 210-1 to 210-A and 212-1 to 212-B of the interface 208. In other aspects, one or more active or passive components can be coupled between the antenna elements of the antenna arrays 122-1 to 122-N and the terminals 210-1 to 210-A and 212-1 to 212-B.

In FIG. 2, the antenna arrays 122-1 and 122-N are respectively tuned to mmW frequency bands 222-1 and 222-N. In some cases, the mmW frequency bands 222-1 and 222-N may be different frequency bands or may be a same frequency band. In general, a frequency band is a continuous spectrum that may have a dedicated purpose defined by a government and may be publicly or privately owned (e.g., unlicensed or licensed). Example mmW frequency bands include the mmW frequency bands for fifth-generation standards, such as a 24 gigahertz (GHz) frequency band, a 28 GHz frequency band, a 31 GHz frequency band, a 39 GHz frequency band, a 43 GHz frequency band, a 47 GHz frequency band, and so forth. Although the antenna arrays 122-1 and 122-N and the wireless transceiver 120 described herein can support the mmW frequency bands 222-1 and 222-N, other implementations may support other frequency bands, such as those that include frequencies below 24 GHz or above 47 GHz. The antenna arrays 122-1 and 122-N are further described with respect to FIGS. 3-1 to 3-2.

FIG. 3-1 illustrates example implementations of two antenna arrays 122-1 and 122-2 that are supported by a hybrid wireless transceiver architecture. In the depicted configuration, the first antenna array 122-1 includes antenna elements 302-1, 302-2 . . . 302-A and the second antenna array 122-2 includes antenna elements 304-1, 304-2 . . . 304-B. The antenna elements 302-1 to 302-A and 304-1 to 304-B can comprise active or passive antenna elements. In some implementations, an antenna element spacing 306-1 between adjacent elements within the first antenna array 122-1 may be approximately a fraction of a center wavelength associated with the mmW frequency band 222-1. Likewise, an antenna element spacing 306-2 between adjacent elements within the second antenna array 122-2 may be approximately a fraction of a center wavelength associated with the mmW frequency band 222-2. The antenna arrays 122-1 and 122-2 may comprise linear arrays, uniform linear arrays, two-dimensional arrays, or a combination thereof.

Within the antenna arrays 122-1 and 122-2, a patch antenna element 308, a dipole antenna element 310, or a bowtie antenna element 312 may be used to implement one or more of the antenna elements 302-1 to 302-A and 304-1 to 304-B. Other types of antenna elements may also be implemented, including slot antenna elements, cross-patch antenna elements, and so forth. The antenna elements 302-1 to 302-A and 304-1 to 304-B may be single-polarized antenna elements, dual-polarized antenna elements, or a combination thereof. The antenna elements 302-1 to 302-A and 304-1 to 304-B are respectively shown to be coupled to the terminals 210-1, 210-2 . . . 210-A and 212-1, 212-2 . . . 212-B of FIG. 2. Although not shown, the antenna elements 302-1 to 302-A or 304-1 to 304-B that include multiple feed ports may be coupled to additional terminals of the interface 208 and other portions of the dedicated circuitry 124-1 to 124-N that are not explicitly shown in FIG. 2.

The antenna arrays 122-1 and 122-2 may have similar orientations or different orientations. In some cases the antenna arrays 122-1 and 122-2 may be located in different areas of the computing device 102. For example, the first antenna array 122-1 may be located along a top side of the computing device 102 while the second antenna array 122-2 is located along a left side or a right side of the computing device 102. In other cases, the antenna arrays 122-1 and 122-2 may be co-located or proximate to one another, an example of which is further described with respect to FIG. 3-2.

FIG. 3-2 illustrates an example arrangement of the antenna arrays 122-1 and 122-2 within the computing device 102 that utilizes a hybrid wireless transceiver architecture. In the depicted configuration, the antenna arrays 122-1 and 122-2 are both positioned in an upper-left corner of the computing device 102 and include different types of antenna elements in different arrangements. In this manner, the antenna arrays 122-1 and 122-2 provide different spatial coverages as described below.

The first antenna array 122-1 includes four dipole antenna elements 314-1 to 314-4 positioned along a top side 316 and a left side 318 of the computing device 102. The dipole antenna elements 314-1 and 314-2 can transmit and receive signals along a vertical direction or Y axis while the dipole antenna elements 314-3 and 312-4 can transmit and receive signals along a horizontal direction or X axis. The second antenna array 122-2 includes four patch antenna elements 320-1 to 320-4 arranged in a two-dimensional shape with respect to a front side 322 of the computing device 102. The patch antenna elements 320-1 to 320-4 can transmit and receive signals above the page along a Z axis.

By utilizing multiple antenna arrays 122-1 and 122-2, the computing device 102 may realize a target spatial coverage for transmitting and receiving signals associated with one or more mmW frequency bands 222-1 to 222-2. The control circuitry 128 may dynamically select which antenna array 122-1 and 122-2 to use based on a current situation. If the control circuitry 128 determines a portion of one of the antenna arrays 122-1 and 122-2 is obstructed (e.g., by a user's appendage), the control circuitry 128 can cause the wireless transceiver 120 to transmit and receive signals via the unobstructed antenna array 122-1 or 122-2. As another example, the control circuitry 128 can select the antenna array 122-1 or 122-2 that provides spatial coverage along a direction to the base station 104 of FIG. 1 or supports a particular mmW frequency band 222-1 to 222-N. The wireless transceiver 120 is further described with respect to FIG. 4-1.

Figures 1, 4:
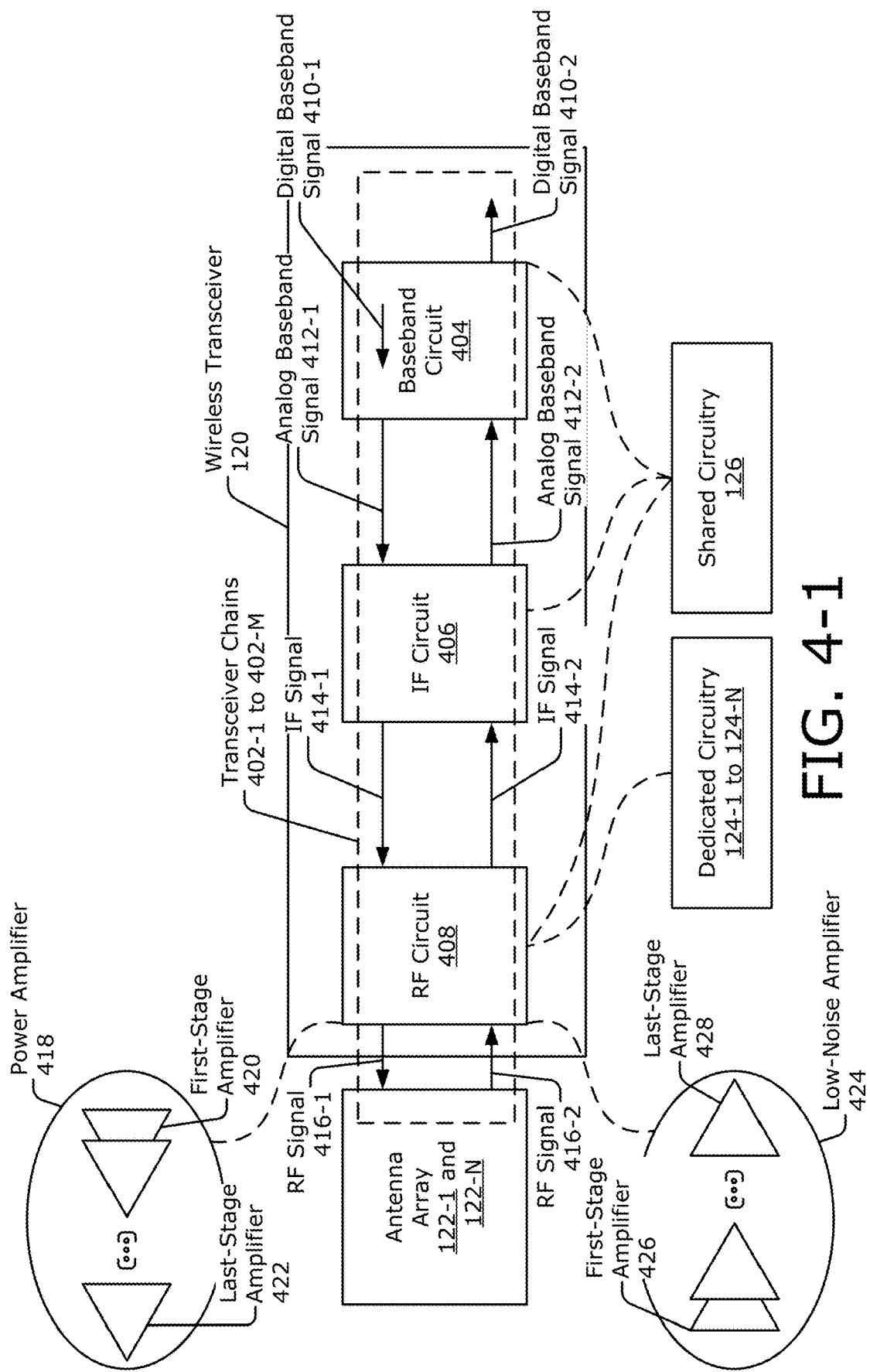
Figures 2, 4:
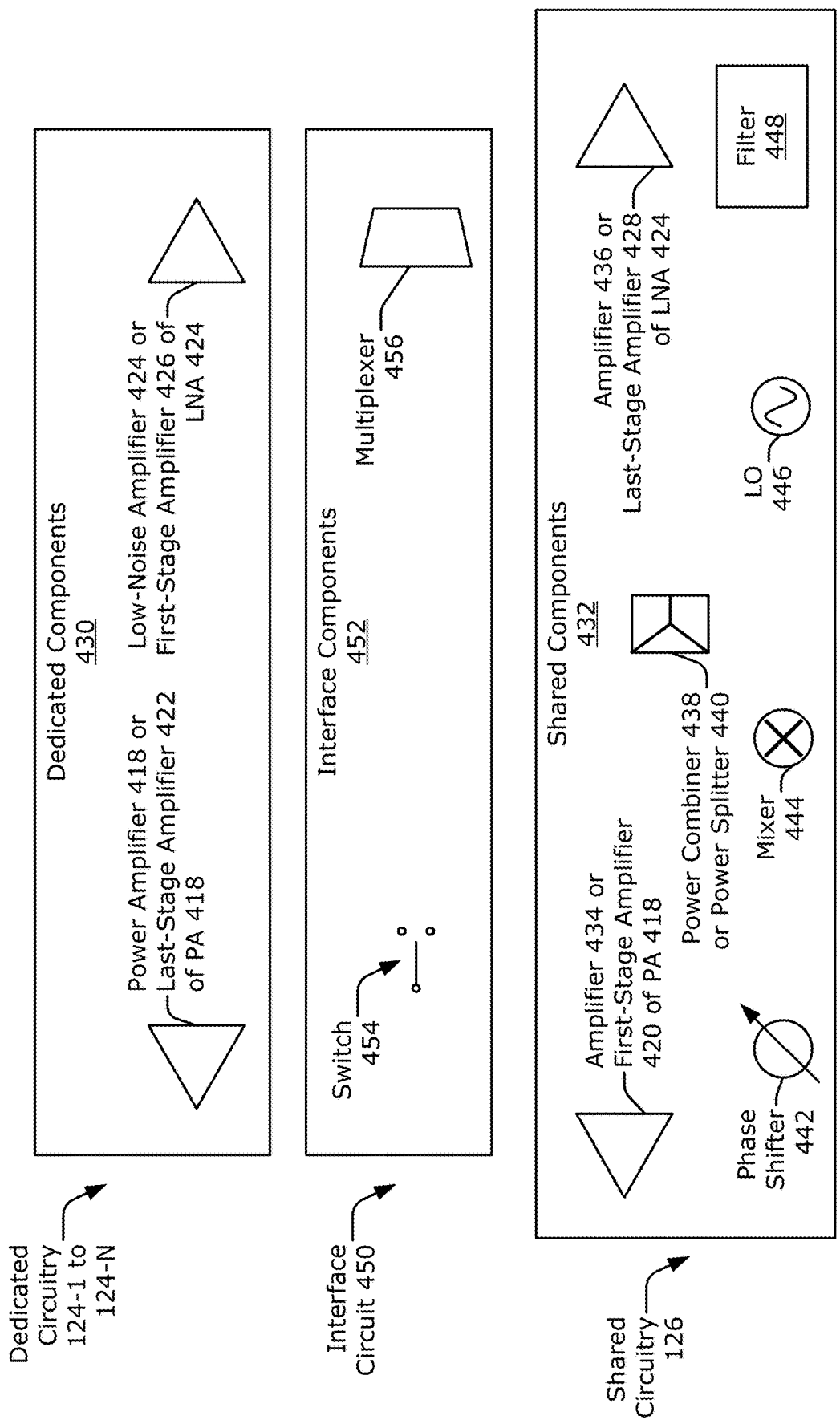

FIG. 4-1 illustrates an example wireless transceiver 120 that utilizes a hybrid wireless transceiver architecture to support the antenna arrays 122-1 and 122-N. The wireless transceiver 120 includes at least two transceiver chains 402-1 to 402-M, where "M" is a positive integer that is based on a total quantity of antenna elements of the antenna arrays 122-1 and 122-N. The transceiver chains 402-1 to 402-M are coupled to the antenna arrays 122-1 and 122-N via the nodes 216-1 to 216-A and 218-1 to 218-B of FIG. 2 and are distributed through portions of a baseband circuit 404, an intermediate-frequency (IF) circuit 406 (IF circuit 406), and a radio-frequency (RF) circuit 408 (RF circuit 408) of the wireless transceiver 120. In some cases, the baseband circuit 404, the IF circuit 406, and the RF circuit 408 may be implemented in separate integrated circuits. For example, the RF circuit 408 may be implemented in the integrated circuit 202 of FIG. 2.

The baseband circuit 404, the IF circuit 406, and the RF circuit 408 include components that enable the wireless transceiver 120 to condition signals that are provided to or accepted from the antenna arrays 122-1 and 122-N. Although not shown, the baseband circuit 404 may be coupled to a modem or a processor within the computing device 102. In general, the IF circuit 406 upconverts baseband signals to an intermediate frequency and downconverts intermediate-frequency signals to baseband. The intermediate frequency can be on the order of several gigahertz, such as between approximately 5 and 15 GHz. Likewise, the radio-frequency circuit 408 upconverts intermediate-frequency signals to radio frequencies and downconverts radio-frequency signals to intermediate frequencies. The radio frequencies can include frequencies in the extremely-high frequency (EHF) spectrum, such as mmW frequencies between approximately 24 and 300 GHz.

Each transceiver chain 402-1 to 402-M within the RF circuit 408 can include at least one power amplifier 418 (PA 418), which may comprise a single amplifier or multiple amplifiers. In this example, the power amplifier 418 includes at least a first-stage amplifier 420 and a last-stage amplifier 422. The transceiver chains 402-1 to 402-M within the RF circuit 408 can also respectively include at least one low-noise amplifier 424 (LNA 424), which may similarly comprise a single amplifier or multiple amplifiers. In this example, the low-noise amplifier 424 includes at least a first-stage amplifier 426 and a last-stage amplifier 428.

Along a transmit path, which is shown traveling from right to left, the baseband circuit 404 generates a digital baseband signal 410-1. Based on the digital baseband signal 410-1, the baseband circuit 404 generates an analog baseband signal 412-1. The IF circuit 406 upconverts the analog baseband signal 412-1 to produce an intermediate-frequency signal 414-1 (IF signal 414-1). The RF circuit 408 upconverts the IF signal 414-1 to generate a radio-frequency signal 416-1 (RF signal 416-1). The RF signal 416-1 is transmitted via one of the antenna arrays 122-1 or 122-N. In some cases, the RF signal 416-1 may represent an uplink signal that is transmitted to the base station 104 of FIG. 1.

Along the receive path, which is shown traveling from left to right, the RF circuit 408 receives another radio-frequency signal 416-2 (RF signal 416-2). The RF signal 416-2 may represent a downlink signal that is received from the base station 104. The RF circuit 408 downconverts the RF signal 416-2 to generate an intermediate-frequency signal 414-2 (IF signal 414-2). The IF circuit 406 downconverts the IF signal 414-2 to generate the analog baseband signal 412-2. The baseband circuit 404 digitizes the analog baseband signal 412-2 to generate the digital baseband signal 410-2. As shown via the multiple upconversion and downconversion stages of the wireless transceiver 120, the wireless transceiver 120 implements a superheterodyne transceiver. Alternatively, the wireless transceiver 120 may be implemented as a direct conversion transceiver without the IF circuit 406 (e.g., with the RF circuit 408 coupled to the baseband circuit 404).

Within the wireless transceiver 120, the dedicated circuitry 124-1 to 124-N implement respective front ends of the transceiver chains 402-1 to 402-M and include at least a portion of the components within the RF circuit 408. The shared circuitry 126 can include other components within the RF circuit 408 and/or components within the IF circuit 406 and the baseband circuit 404. Example components that are considered part of the dedicated circuitry 124-1 to 124-N and the shared circuitry 126 are further described with respect to FIG. 4-2.

FIG. 4-2 illustrates example components within the dedicated circuitry 124-1 to 124-N, the shared circuitry 126, and an interface circuit 450 for supporting multiple antenna arrays 122-1 to 122-N with a hybrid wireless transceiver architecture. In the depicted configuration, the dedicated circuitry 124-1 to 124-N includes dedicated components 430, such as the power amplifier 418 or a last-stage amplifier 422 of the power amplifier 418 within each of the transceiver chains 402-1 to 402-M of FIG. 4-1. The dedicated components 430 may also include the low-noise amplifier 424 or the first-stage amplifier 426 of the low-noise amplifier 424 within each of the transceiver chains 402-1 to 402-M.

The shared circuitry 126 includes shared components 432, such as an amplifier 434 or other beginning-stage amplifiers of the power amplifier 418 (e.g., the first-stage amplifier 420). The shared components 432 may also include an amplifier 436 or ending-stage amplifiers of the low-noise amplifier 424 (e.g., the last-stage amplifier 428). The amplifiers 434 and 436 may be implemented as variable-gain amplifiers, passive amplifiers, or active amplifiers within the RF circuit 408, the IF circuit 406 or the baseband circuit 404. Generally, the amplifiers 434 and 436 are respectively implemented within the transmit path prior to the power amplifier 418 and implemented within the receive path following the low-noise amplifier 424. Other types of shared components 432 may include at least one power combiner 438 or power splitter 440, phase shifter 442, mixer 444, local oscillator 446, filter 448, and so forth. In some implementations, multiple phase shifters 442 may be implemented within respective communication paths (e.g., coupled between the mixer 444 and the power amplifier 418 or coupled between the mixer 444 and the low-noise amplifier 424) or within a path between the local oscillator 446 and the mixer 444 (e.g., coupled between the local oscillator 446 and the mixer 444). The shared components 432 are part of multiple transceiver chains 402-1 to 402-M and at least one of the shared components 432 is coupled to two or more dedicated components 430 associated with two or more antenna arrays 122-1 to 122-N.

The dedicated components 430 and the shared components 432 may be fully integrated within an integrated circuit, partially integrated within the integrated circuit, or composed of discrete components. In some implementations, the wireless transceiver 120 includes an interface circuit 450, which can include one or more interface components 452 to couple the shared components 432 to the dedicated components 430. Example types of interface components 452 include a switch 454 and a multiplexer 456. The switch 454 can be implemented using one or more transistors, such as metal-oxide-semiconductor field-effect transistors (MOSFETs), junction field-effect transistors (JFETs), bipolar junction transistors (BJTs), and so forth. For example, the switch 454 can comprise an n-channel metal-oxide-semiconductor field-effect transistor (NMOSFET) or a p-channel metal-oxide-semiconductor field-effect transistor (PMOSFET) and can have a thin or thick gate oxide layer. The interface circuit 450 is further described with respect to FIG. 5-3. Example implementations of the dedicated circuitry 124-1 and 124-2, and the shared circuitry 126 are shown in FIGS. 5-1 to 5-3.

FIG. 5-1 illustrates an example implementation of the radio-frequency circuit 408 that utilizes a hybrid wireless transceiver architecture for supporting multiple antenna arrays 122-1 to 122-2. For simplicity, two transceiver chains 402-1 and 402-2 respectively associated with the antenna element 302-1 of the first antenna array 122-1 and the antenna element 304-1 of the second antenna array 122-2 are shown. The first transceiver chain 402-1 is coupled to the antenna element 302-1 via the node 216-1, and the second transceiver chain 402-2 is coupled to the antenna element 304-1 via the node 218-1. The transceiver chains 402-1 and 402-2 are implemented with separate dedicated components 430 and with at least a portion of the shared components 432 as further described below.

Within the dedicated circuitry 124-1, the first transceiver chain 402-1 includes the power amplifier 418-1, which is coupled between the node 216-1 and the node 220-1, and the low-noise amplifier 424-1, which is coupled between the node 216-1 and the node 220-2. Likewise, the second transceiver chain 402-2 within the dedicated circuitry 124-2 includes the power amplifier 418-2, which is coupled between the node 218-1 and the node 220-1, and the low-noise amplifier 424-2, which is coupled between the node 218-1 and the node 220-2. Within the shared circuitry 126, both of the transceiver chains 402-1 and 402-2 include the mixers 444-1 and 444-2 and the local oscillator 446. The mixers 444-1 and 444-2 are respectively coupled between the nodes 220-1 and 220-2 and other components (not shown in FIG. 5-1) of the wireless transceiver 120.

If the antenna arrays 122-1 and 122-2 support different mmW frequency bands 222-1 and 222-2, the local oscillator 446 may generate local oscillator signals with different frequencies in some implementations. In this manner, the intermediate-frequency signals 414-1 and 414-2 (of FIG. 4-1) may have respective frequencies that are independent of which antenna array 122-1 or 122-2 is selected. In other implementations, the local oscillator 446 may generate a single local oscillator signal with a frequency that is used to upconvert the intermediate-frequency signal 414-1 or downconvert the radio-frequency signal 416-2 if either of the antenna arrays 122-1 or 122-2 is selected.

In this implementation, the control circuitry 128 is coupled to the power amplifiers 418-1 and 418-2 and the low-noise amplifiers 424-1 and 424-2. To cause signals to propagate to or from the antenna element 302-1 via the first transceiver chain 402-1, the control circuitry 128 can cause the power amplifier 418-2 and the low-noise amplifier 424-2 of the second transceiver chain 402-2 to be in an inactive state and can cause the power amplifier 418-1 or the low-noise amplifier 424-1 of the first transceiver chain 402-1 to be in an active state. The inactive state or the active state can be triggered via the control circuitry 128 by, for instance, respectively disabling or enabling power that is supplied to an amplifier. The control circuitry 128 may generate a control signal, which may be a multi-bit signal with each bit or group of bits configured to control a state of the amplifiers 418-1, 418-2, 424-1, and 424-2. In some implementations, the transceiver chains 402-1 and 402-2 may share some gain stages within the power amplifiers 418-1 and 418-2 or the low-noise amplifiers 424-1 and 424-2, as further described with respect to FIG. 5-2.

FIG. 5-2 illustrates another example implementation of the radio-frequency circuit 408 that utilizes a hybrid wireless transceiver architecture for supporting multiple antenna arrays 122-1 to 122-2. In contrast to FIG. 5-1, the power amplifiers 418-1 and 418-2 (not explicitly indicated in FIG. 5-2) respectively include the last-stage amplifiers 422-1 and 422-2 within the dedicated circuitry 124-1 and 124-2, and jointly include the first-stage amplifier 420 within the shared circuitry 126. Likewise, the low-noise amplifiers 424-1 and 424-2 (not explicitly indicated in FIG. 5-2) respectively include the first-stage amplifiers 426-1 and 426-2 within the dedicated circuitry 124-1 and 124-2, and jointly include the last-stage amplifier 428 within the shared circuitry 126. By sharing the first-stage amplifier 420 and the last-stage amplifier 428, a total size of the radio-frequency circuit 408 may be reduced relative to other architectures that include separate first-stage amplifiers 420 or last-stage amplifiers 428 for different transceiver chains 402-1 and 402-2.

In this implementation, the antenna arrays 122-1 and 122-2 may be individually activated via the control circuitry 128 by activating or deactivating the last-stage amplifiers 422-1 or 422-2 or the first-stage amplifiers 426-1 and 426-2.

In other implementations, the wireless transceiver 120 may include the interface circuit 450 of FIG. 4-2, to control which of the antenna arrays 122-1 and 122-2 are selected, as further described with respect to FIG. 5-3.

FIG. 5-3 illustrates an additional example implementation of the radio-frequency circuit 408 that utilizes a hybrid wireless transceiver architecture for supporting multiple antenna arrays. In the depicted configuration, the radio-frequency circuit 408 includes the interface circuit 450, which is coupled between the dedicated circuitry 124-1 and 124-2 and the shared circuitry 126. The interface circuit 450 includes a switch 454-1, which is coupled between the node 220-1 and both of the power amplifiers 418-1 and 418-2. The interface circuit 450 also includes a switch 454-2, which is coupled between the node 220-2 and both of the low-noise amplifiers 424-1 and 424-2. In some cases, the switches 454-1 and 454-2 can couple the nodes 220-1 to 220-2 or the dedicated circuitry 124-1 and 124-2 to ground while in an open state.

Instead of controlling a state of the power amplifiers 418-1 and 418-2 and low-noise amplifiers 424-1 and 424-2, the control circuitry 128 controls the states of the switches 454-1 and 454-2 to select one of the antenna arrays 122-1 or 122-2 and enable signals to propagate via the associated transceiver chain 402-1 or 402-2. To select the first antenna array 122-1, for example, the control circuitry 128 causes the switch 454-1 to connect the node 220-1 to the power amplifier 418-1 or causes the switch 454-2 to connect the node 220-2 to the low-noise amplifier 424-1. By implementing the interface circuit 450 along the communication paths between the dedicated circuitry 124-1 to 124-N and the shared circuitry 126, losses associated with the interface circuitry 450 have less of an impact on system linearity or noise figure performance relative to other wireless transceiver architectures that have the interface circuit coupled to the antenna arrays 122-1 and 122-2.

Although only one antenna element of each of the antenna arrays 122-1 and 122-2 are shown in FIGS. 5-1 to 5-3, a similar architecture may exist between other antenna elements of the antenna arrays 122-1 and 122-2, such as between second antenna elements 302-2 and 304-2 of the first antenna array 122-1 and the second antenna array 122-2, respectively. In this aspect, other dedicated circuitry are respectively coupled to the second antenna elements 302-2 and 304-2 and another shared circuitry is coupled to the other dedicated circuitry. Furthermore, this architecture can be applied to more than two antenna arrays such that other antenna elements of other antenna arrays are also coupled to the nodes 220-1 and 220-2 with or without an interface circuit 450.

Figure 6:
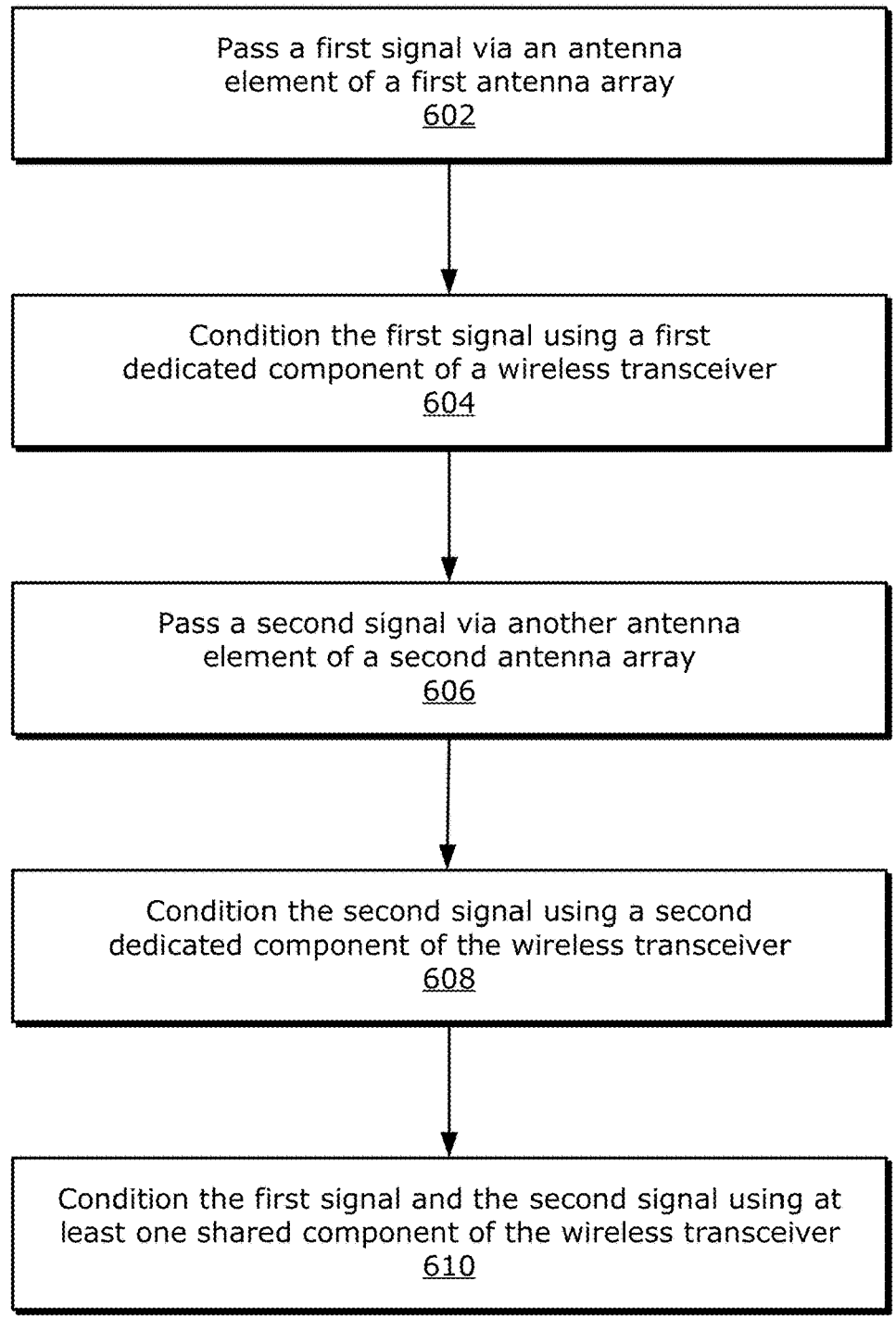
FIG. 6 is a flow diagram illustrating an example process for supporting multiple antenna arrays via a hybrid wireless transceiver architecture.

FIG. 6 is a flow diagram illustrating an example process 600 for supporting multiple antenna arrays via a hybrid wireless transceiver architecture. The process 600 is described in the form of a set of blocks 602-610 that specify operations that can be performed. However, operations are not necessarily limited to the order shown in FIG. 6 or described herein, for the operations may be implemented in alternative orders or in fully or partially overlapping manners. Operations represented by the illustrated blocks of the process 600 may be performed by a wireless transceiver 120 (e.g., of FIG. 1, 2, or 4-1) or multiple antenna arrays 122-1 to 122-N (e.g., of FIG. 1 or 2). More specifically, the operations of the process 600 may be performed by dedicated circuitry 124-1 to 124-N and shared circuitry 126 of FIG. 1, 2, or 5-1 to 5-3.

At block 602, a first signal is passed via an antenna element of a first antenna array. For example, the antenna element 302-1 of the first antenna array 122-1 passes the radio-frequency signal 416-1 or 416-2 of FIG. 4-1. The antenna element 302-1 may transmit the radio-frequency signal 416-1, which is produced via the transceiver chain 402-1, or may receive the radio-frequency signal 416-2, which is accepted by the transceiver chain 402-1.

At block 604, the first signal is conditioned using a first dedicated component of a wireless transceiver. For example, the power amplifier 418-1 in FIG. 5-1 or the last-stage amplifier 422-1 of the power amplifier 418-1 in FIG. 5-2 can comprise a dedicated component 430 that amplifies the radio-frequency signal 416-1. To condition the signal, the control circuitry 128 activates the power amplifier 418-1 or the last-stage amplifier 422-1. Alternatively, if the wireless transceiver 120 includes the interface circuit 450, as shown in FIG. 5-3, the control circuitry 128 causes the switch 454-1 to connect the node 220-1 to the dedicated component 430 associated with the antenna element 302-1 (e.g., to the power amplifier 418-1 or the last-stage amplifier 422-1). Additionally or alternatively, the low-noise amplifier 424-1 in FIG. 5-1 or the first-stage amplifier 426-1 of the low-noise amplifier 424-1 in FIG. 5-2 can comprise the dedicated component 430 that amplifies the radio-frequency signal 416-2.

At block 606, a second signal is passed via another antenna element of a second antenna array. For example, the antenna element 304-1 of the second antenna array 122-2 passes the radio-frequency signal 416-1 or 416-2 of FIG. 4-1. The antenna element 304-1 may transmit the radio-frequency signal 416-1, which is produced via the transceiver chain 402-2, or receive the radio-frequency signal 416-2, which is accepted by the transceiver chain 402-2.

At block 608, the second signal is conditioned using a second dedicated component of the wireless transceiver. For example, the power amplifier 418-2 in FIG. 5-1 or the last-stage amplifier 422-2 of the power amplifier 418-2 in FIG. 5-2 can comprise a dedicated component 430 that amplifies the radio-frequency signal 416-1. To condition the signal, the control circuitry 128 activates the power amplifier 418-2 or the last-stage amplifier 422-2. Alternatively if the wireless transceiver 120 includes the interface circuit 450, as shown in FIG. 5-3, the control circuitry 128 causes the switch 454-2 to connect the node 220-2 to the dedicated component 430 associated with the antenna element 304-1 (e.g., to the power amplifier 418-2 or the last-stage amplifier 422-2). Additionally or alternatively, the low-noise amplifier 424-2 in FIG. 5-1 or the first-stage amplifier 426-2 of the low-noise amplifier 424-2 in FIG. 5-2 can comprise the dedicated component 430 that amplifies the radio-frequency signal 416-2.

At block 610, the first signal and the second signal at are conditioned using at least one shared component of the wireless transceiver. For example, the at least one shared component 432 of the wireless transceiver 120 conditions the first signal and the second signal. The at least one shared component 432 can comprise the mixer 444-1 or 444-2 in FIGS. 5-1 to 5-3, the first-stage amplifier 420 of the power amplifiers 418-1 and 418-2 in FIG. 5-2, the last-stage amplifier 428 of the low-noise amplifiers 424-1 and 424-2 in FIG. 5-2, or any of the other shared components 432 shown in FIG. 4-2 or described herein.

In some situations, the antenna arrays 122-1 and 122-2 can be used during a same time period such that steps 602 to 610 are performed during this time period. In other situations, the antenna arrays 122-1 and 122-2 can be used at different time periods such that the steps 602 to 604 are performed during a first time period and the steps 606 and 608 are performed during a second time period. As such, the at least one shared component 432 can condition the first signal during the first time period and condition the second signal during the second time period.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
a wireless transceiver comprising:
a first amplifier in a first integrated circuit, the first amplifier configured to be operably coupled to a first antenna array;
a second amplifier in the first integrated circuit, the second amplifier configured to be operably coupled to a second antenna array; and
a mixer operably coupled to the first amplifier and the second amplifier.

2. The apparatus of claim 1, wherein the integrated circuit comprises a radio-frequency integrated circuit and the wireless transceiver comprises the radio-frequency integrated circuit, the radio-frequency integrated circuit comprising the first amplifier, the second amplifier, and the mixer.

3. The apparatus of claim 1, wherein the integrated circuit comprises a radio-frequency integrated circuit and the wireless transceiver further comprises:
an intermediate-frequency integrated circuit comprising the mixer.

4. The apparatus of claim 1, wherein:
the first amplifier comprises a first power amplifier; and
the second amplifier comprises a second power amplifier.

5. The apparatus of claim 4, wherein an input of the first power amplifier and an input of the second power amplifier are operably coupled to an output of the mixer.

6. The apparatus of claim 1, wherein:
the first amplifier comprises a first low-noise amplifier; and
the second amplifier comprises a second low-noise amplifier.

7. The apparatus of claim 6, wherein an output of the first low-noise amplifier and an output of the second low-noise amplifier are operably coupled to an input of the mixer.

8. The apparatus of claim 1, wherein:
the first amplifier comprises a last-stage amplifier;
the second amplifier comprises another last-stage amplifier; and
the wireless transceiver comprises a first-stage amplifier operably coupled between the last-stage amplifier and the mixer and operably coupled between the other last-stage amplifier and the mixer.

9. The apparatus of claim 1, wherein:
the first amplifier comprises a first-stage amplifier;
the second amplifier comprises another first-stage amplifier; and
the wireless transceiver comprises a last-stage amplifier operably coupled between the first-stage amplifier and the mixer and operably coupled between the other first-stage amplifier and the mixer.

10. The apparatus of claim 1, wherein the wireless transceiver comprises a phase shifter operably coupled between the first amplifier and the mixer and operably coupled between the second amplifier and the mixer.

11. The apparatus of claim 1, wherein:
the first amplifier and the second amplifier are configured to selectively be in an active state or an inactive state; and
the wireless transceiver comprises control circuitry configured to selectively cause:
the first amplifier to be in the active state and the second amplifier to be in the inactive state;
the second amplifier to be in the active state and the first amplifier to be in the inactive state; or
the first amplifier to be in the active state and the second amplifier to be in the active state.

12. The apparatus of claim 1, further comprising an interface circuit operably coupled between the first amplifier and the mixer and operably coupled between the second amplifier and the mixer, the interface circuit configured to selectively:
connect the first amplifier to the mixer and disconnect the second amplifier from the mixer during a time period; or
connect the second amplifier to the mixer and disconnect the first amplifier from the mixer during the time period.

13. The apparatus of claim 1, wherein:
the first amplifier is configured to be operably coupled to the first antenna array and operably decoupled from the second antenna array during at least a time period;
the second amplifier is configured to be operably coupled to the second antenna array and operably decoupled from the first antenna array during at least the time period; and
the mixer is configured to be operably coupled to both the first antenna array and the second antenna array during at least the time period.

14. The apparatus of claim 1, wherein the wireless transceiver comprises a filter configured to be operably coupled between the first amplifier and the mixer and operably coupled between the second amplifier and the mixer.

15. The apparatus of claim 1, wherein the mixer is configured to:
upconvert a signal to a millimeter-wave frequency band; or
downconvert another signal that is associated with the millimeter-wave frequency band.

16. A method for supporting multiple antenna arrays, the method comprising:
passing a first signal via an antenna element of a first antenna array;
operably coupling a first amplifier of a wireless transceiver to the first antenna array and operably decoupling the first amplifier from a second antenna array during at least a time period;
amplifying the first signal using the first amplifier;
passing a second signal via an antenna element of the second antenna array;
operably coupling a second amplifier of the wireless transceiver to the second antenna array and operably decoupling the second amplifier from the first antenna array during at least the time period;

amplifying the second signal using the second amplifier;

operably coupling a same mixer of the wireless transceiver to both the first antenna array and the second antenna array during at least the time period; and converting frequencies of the first signal and the second signal using the same mixer.

17. The method of claim 16, wherein the converting frequencies of the first signal and the second signal using the mixer comprises:

upconverting the first signal using the mixer; and upconverting the second signal using the mixer.

18. The method of claim 16, wherein the converting frequencies of the first signal and the second signal using the mixer comprises:

downconverting the first signal using the mixer; and downconverting the second signal using the mixer.

19. The method of claim 16, further comprising amplifying the first signal and the second signal using a third amplifier of the wireless transceiver.

20. The method of claim 16, further comprising:

adjusting a phase of the first signal using a phase shifter of the wireless transceiver; and adjusting a phase of the second signal using the phase shifter.

21. An apparatus comprising:

a first antenna array;

a second antenna array; and a wireless transceiver comprising:

a first integrated circuit coupled to the first antenna array and the second antenna array, the first integrated circuit comprising:

first dedicated circuitry dedicated to the first antenna array; and second dedicated circuitry dedicated to the second antenna array; and a second integrated circuit coupled to the first dedicated circuitry and the second dedicated circuitry, the second integrated circuit comprising shared circuitry that is shared with the first antenna array and the second antenna array.

22. The apparatus of claim 21, wherein the first integrated circuit comprises a radio-frequency circuit.

23. The apparatus of claim 22, wherein the second integrated circuit comprises an intermediate-frequency circuit.

24. The apparatus of claim 22, wherein the second integrated circuit comprises a baseband circuit.

25. An apparatus comprising:

a wireless transceiver comprising:

a first amplifier configured to be operably coupled to a first antenna array;

a second amplifier configured to be operably coupled to a second antenna array; and a mixer operably coupled to the first amplifier and the second amplifier, wherein the first amplifier comprises a last-stage amplifier, the second amplifier comprises another last-stage amplifier, and the wireless transceiver comprises a first-stage amplifier operably coupled between the last-stage amplifier and the mixer and operably coupled between the other last-stage amplifier and the mixer, or wherein the first amplifier comprises a first-stage amplifier, the second amplifier comprises another first-stage amplifier, and the wireless transceiver comprises a last-stage amplifier operably coupled between the first-stage amplifier and the mixer and operably coupled between the other first-stage amplifier and the mixer.

26. An apparatus comprising:

a wireless transceiver comprising:

a first amplifier configured to be operably coupled to a first antenna array;

a second amplifier configured to be operably coupled to a second antenna array; and a mixer operably coupled to the first amplifier and the second amplifier, wherein the wireless transceiver comprises a filter configured to be operably coupled between the first amplifier and the mixer and operably coupled between the second amplifier and the mixer.

* * * * *